(12) United States Patent
Hopkins et al.

(10) Patent No.: US 10,557,524 B2
(45) Date of Patent: Feb. 11, 2020

(54) GEARING SYSTEM FOR COMPOUND GEAR REDUCTION

(71) Applicant: Textron Inc., Providence, RI (US)

(72) Inventors: Brian Russell Hopkins, Irvine, CA (US); Eric Nels Anderfaas, Westminster, CA (US); Jared Trauernicht, Corona, CA (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 15/786,629

(22) Filed: Oct. 18, 2017

(65) Prior Publication Data

US 2018/0106329 A1    Apr. 19, 2018

Related U.S. Application Data

(60) Provisional application No. 62/409,681, filed on Oct. 18, 2016.

(51) Int. Cl.

| | |
|---|---|
| *F16H 3/58* | (2006.01) |
| *F16H 3/00* | (2006.01) |
| *B60W 10/02* | (2006.01) |
| *B60W 10/12* | (2012.01) |
| *B60W 10/10* | (2012.01) |
| *F16H 59/66* | (2006.01) |

(52) U.S. Cl.
CPC ............. *F16H 3/005* (2013.01); *B60W 10/02* (2013.01); *B60W 10/10* (2013.01); *B60W 10/12* (2013.01); *F16H 3/58* (2013.01); *B60Y 2200/20* (2013.01); *F16H 59/66* (2013.01)

(58) Field of Classification Search
USPC .......................................................... 74/745
See application file for complete search history.

(56) References Cited

U.S. PATENT DOCUMENTS

| | | | | |
|---|---|---|---|---|
| 2,920,504 A | * | 1/1960 | Sommer ................. | F16H 59/02 74/355 |
| 4,716,775 A | * | 1/1988 | Horii ....................... | F16H 3/085 74/15.4 |
| 4,858,495 A | * | 8/1989 | Horsch ................... | F16H 3/093 74/745 |
| 4,964,313 A | * | 10/1990 | Davis ...................... | F16D 11/10 192/48.91 |
| 5,058,455 A | * | 10/1991 | Nemoto ................. | F16H 37/043 74/606 R |

(Continued)

*Primary Examiner* — Dirk Wright
(74) *Attorney, Agent, or Firm* — Sandberg Phoenix & von Gontard PC

(57) ABSTRACT

A transmission comprising an input shaft connectable to a power generation device such that the input shaft is rotatable at a power input rotational speed, an output shaft connectable to a driveline of the vehicle, and a plurality of gear sets selectable to operably connect the input shaft to the output shaft providing a rotational speed reduction ratio therebetween. The gear sets comprise a master active gear set having a master gear ratio, a slave active gear set having a slave gear ratio, and a passive gear set having a passive gear ratio. The passive gear set is operable to selectively engage the master and slave active gear sets to provide the high numeric compound ratio rotational speed reduction that is the product of the master active gear ratio, the slave active gear ratio and the passive gear ratio.

14 Claims, 8 Drawing Sheets

(56) References Cited

U.S. PATENT DOCUMENTS

| | | | | |
|---|---|---|---|---|
| 5,105,675 A * | 4/1992 | Langford | ............ | B60W 30/1819 |
| | | | | 701/67 |
| 5,178,039 A * | 1/1993 | Shirley | .................. | F16H 3/093 |
| | | | | 74/329 |
| 5,179,869 A * | 1/1993 | Reynolds | ............ | F16H 63/3013 |
| | | | | 74/110 |
| 5,193,410 A * | 3/1993 | Stine | ..................... | F16H 59/70 |
| | | | | 74/336 R |
| 5,216,931 A * | 6/1993 | Hirsch | .................. | F16H 61/16 |
| | | | | 74/335 |
| 5,239,887 A * | 8/1993 | Muller | .................. | B60K 17/08 |
| | | | | 74/15.4 |
| 5,970,809 A * | 10/1999 | Nam | ..................... | B60K 17/28 |
| | | | | 74/15.86 |
| 6,360,623 B1 * | 3/2002 | Matsufuji | ............ | F16H 37/043 |
| | | | | 74/15.66 |
| 6,581,744 B2 * | 6/2003 | Matsufuji | ............ | F16H 37/043 |
| | | | | 192/48.614 |
| 6,988,426 B2 * | 1/2006 | Calvert | .................. | F16H 3/093 |
| | | | | 74/331 |
| 6,997,074 B2 * | 2/2006 | Wadas | ................. | B60W 10/06 |
| | | | | 74/335 |
| 8,561,493 B2 * | 10/2013 | Hoffmann | ............ | F16H 37/046 |
| | | | | 74/330 |
| 8,635,925 B2 * | 1/2014 | Gerlofs | .................. | F16H 61/16 |
| | | | | 74/329 |
| 8,726,749 B2 * | 5/2014 | Hirsch | .................. | F16D 23/14 |
| | | | | 74/335 |
| 8,943,922 B2 * | 2/2015 | Wikner | .................. | F16H 63/36 |
| | | | | 74/473.25 |
| 9,856,973 B1 * | 1/2018 | Owen | .................. | F16H 59/105 |
| 2009/0272211 A1 * | 11/2009 | Hoffmann | ............ | F16H 37/042 |
| | | | | 74/325 |
| 2015/0152961 A1 * | 6/2015 | Stevens | .................. | F16H 61/16 |
| | | | | 74/473.21 |

* cited by examiner

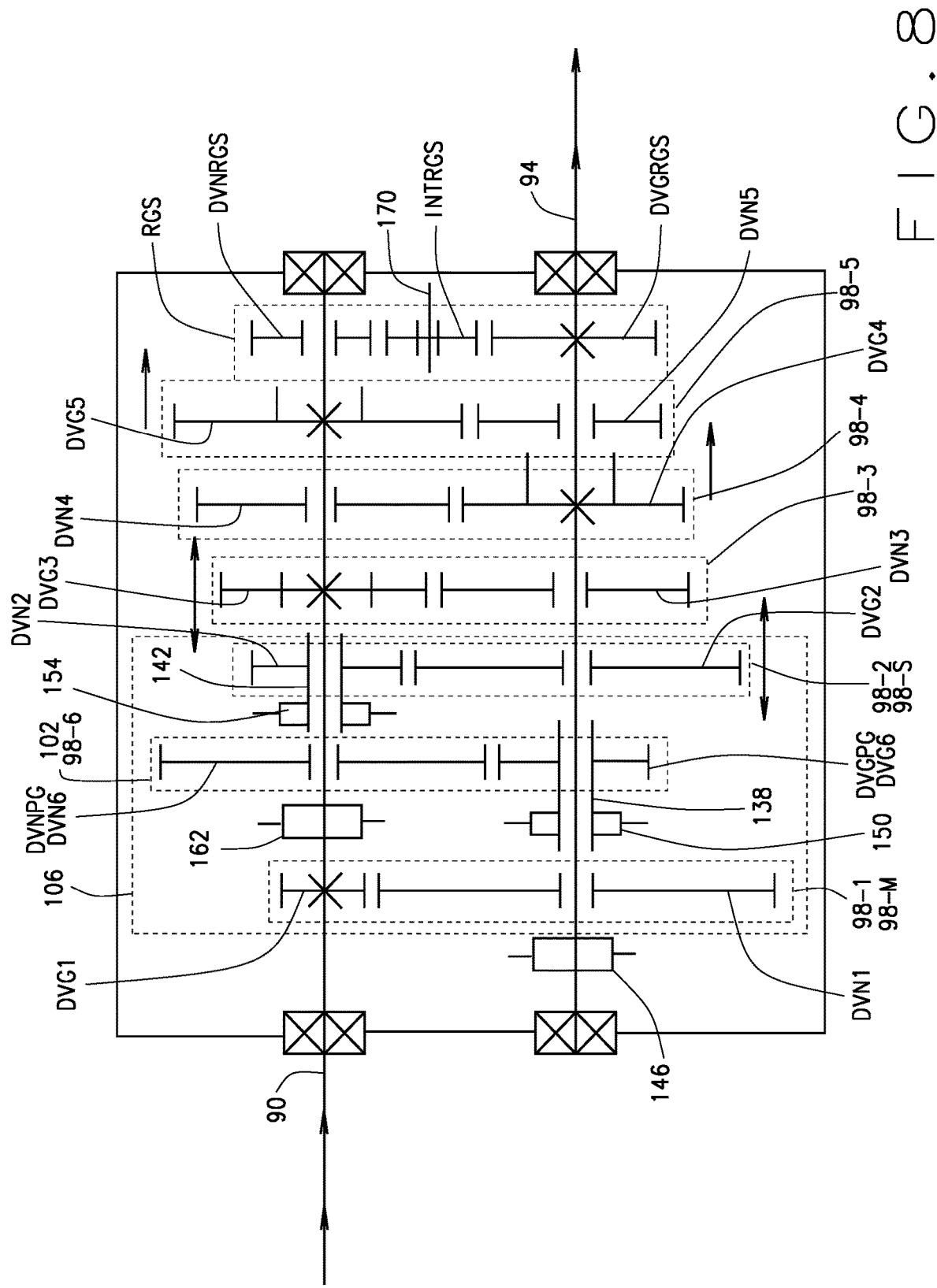

GEARING SYSTEM FOR COMPOUND GEAR REDUCTION

CROSS-REFERENCE TO RELATED APPLICATIONS

This application claims the benefit of U.S. Provisional Application No. 62/409,681, filed on Oct. 18, 2016. The disclosure of the above application is incorporated herein by reference in its entirety.

FIELD

The present teachings relate to vehicle driveline configuration.

BACKGROUND

The statements in this section merely provide background information related to the present disclosure and may not constitute prior art.

At times off-road vehicles, such as trucks, cars, sport utility vehicles (SUVs), cargo vehicles, shuttle vehicles, golf carts, all-terrain vehicles (ATVs), utility task vehicles (UTVs), recreational off-highway vehicles (ROVs), side-by-side vehicles (SSV), worksite vehicles, buggies, motorcycles, tactical vehicles, etc., must travel slowly to negotiate difficult terrain. Therefore, the vehicle driveline must comprise gearing that is structured and operable to provide a low gear ratio, also referred to as a numerically high reduction ratio of rotational speed (e.g., a 7.46:1 reduction), between the input and output of the driveline (e.g., between the input and output shafts of a vehicle transmission). In many known vehicle drivelines this ratio of rotational speed reduction is achieved by implementing a low gear set, e.g., a "granny gear" set in the transmission, or by including a two speed transfer case having a low gear set and a high gear set in series with the transmission. However, in a two shaft transmission, implementation of a "granny gear" can be difficult because it is difficult to achieve such a numerically high reduction ratio (e.g., a 7.46:1 reduction) with single gear set between the two shafts. Alternatively, complex gearing systems have been attempted that require two or more additional transmission shafts to achieve both the desired low gear ratio and the correct direction of rotation of the transmission output shaft. These additional shafts require space in the transmission, and additional bearings and machined bores within the transmission case, thereby adding packaging volume, parts and cost to the transmission.

SUMMARY

In various embodiments, the present disclosure provides a transmission comprising an input shaft connectable to a power generation device such that the input shaft is rotatable at a power input rotational speed, an output shaft connectable to a driveline of the vehicle, and a plurality of gear sets selectable to operably connect the input shaft to the output shaft providing a rotational speed reduction ratio therebetween. The gear sets comprise a master active gear set having a master gear ratio, a slave active gear set having a slave gear ratio, and a passive gear set having a passive gear ratio. The passive gear set is operable to selectively engage the master and slave active gear sets to provide the high numeric compound ratio rotational speed reduction that is the product of the master active gear ratio, the slave active gear ratio and the passive gear ratio.

In various other embodiments, the present disclosure provides a method for outputting a rotational speed reduction ratio between an input shaft and an output shaft of a transmission. The method comprises selectively operably connecting at least one gear of a master active gear set of the transmission to one of an input shaft and an output shaft of the transmission, wherein the master active gear set has a master gear ratio. The method additionally comprises selectively operably connecting at least one gear of a slave active gear set of the transmission to the other of the one of the input shaft and the output shaft of the transmission, wherein the slave active gear set having a slave gear ratio. Furthermore, the method comprises selectively engaging a compound ratio gear set of the transmission to provide a high numeric compound ratio rotational speed reduction between the input shaft and the output shaft of the transmission. Selectively engaging the compound ratio gear set comprises selectively engaging a passive gear set of the transmission between the master active gear set and the slave active gear set such that the master active gear set is operably connected to the slave active gear set via the passive gear set, thereby defining the compound ratio gear set comprising the master active gear set, the slave active gear set and the passive gear set. The compound ratio gear set is structured and operable to provide the high numeric compound ratio rotational speed reduction between the input shaft and the output shaft of the transmission, wherein the high numeric compound ratio is substantially equal to the product of the master active gear ratio, the slave gear ratio and the passive gear ratio.

In various embodiments, the present disclosure provides a vehicle transmission for a vehicle is provided. In various embodiments the transmission comprises an input shaft connectable to a power generation device such that the input shaft is rotatable by the power generation device at a power input rotational speed, an output shaft connectable to a driveline of the vehicle, and a plurality of gear sets disposed on the input and output shafts, at least one gear of each gear set selectively engageable with the input shaft and/or the output shaft such that the output shaft is rotatable at a power output rotational speed. Each gear set is structured and operable to provide a gear ratio such that the power output rotational speed can be reduced (or increased) from the power input rotational speed based on the respective gear ratio. The gear sets comprise a master active gear set having a master gear ratio, a slave active gear set having a slave gear ratio, and a passive gear set having a passive gear ratio. One gear of the passive gear set is connected to or engageable with one gear of the master or slave active gear sets, and another gear of the passive gear set is connected to or engageable with one gear of the other of the master and slave gear sets such that the compound ratio of the input shaft to the output shaft is the product of the master, slave and passive gear ratios.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 8 is a schematic of a portion of the transmission comprising the compound ratio low gear set shown in FIG. 1, in accordance with still yet various other embodiments of the present disclosure.

Corresponding reference numerals indicate corresponding parts throughout the several views of drawings.

DETAILED DESCRIPTION

Figure 1:
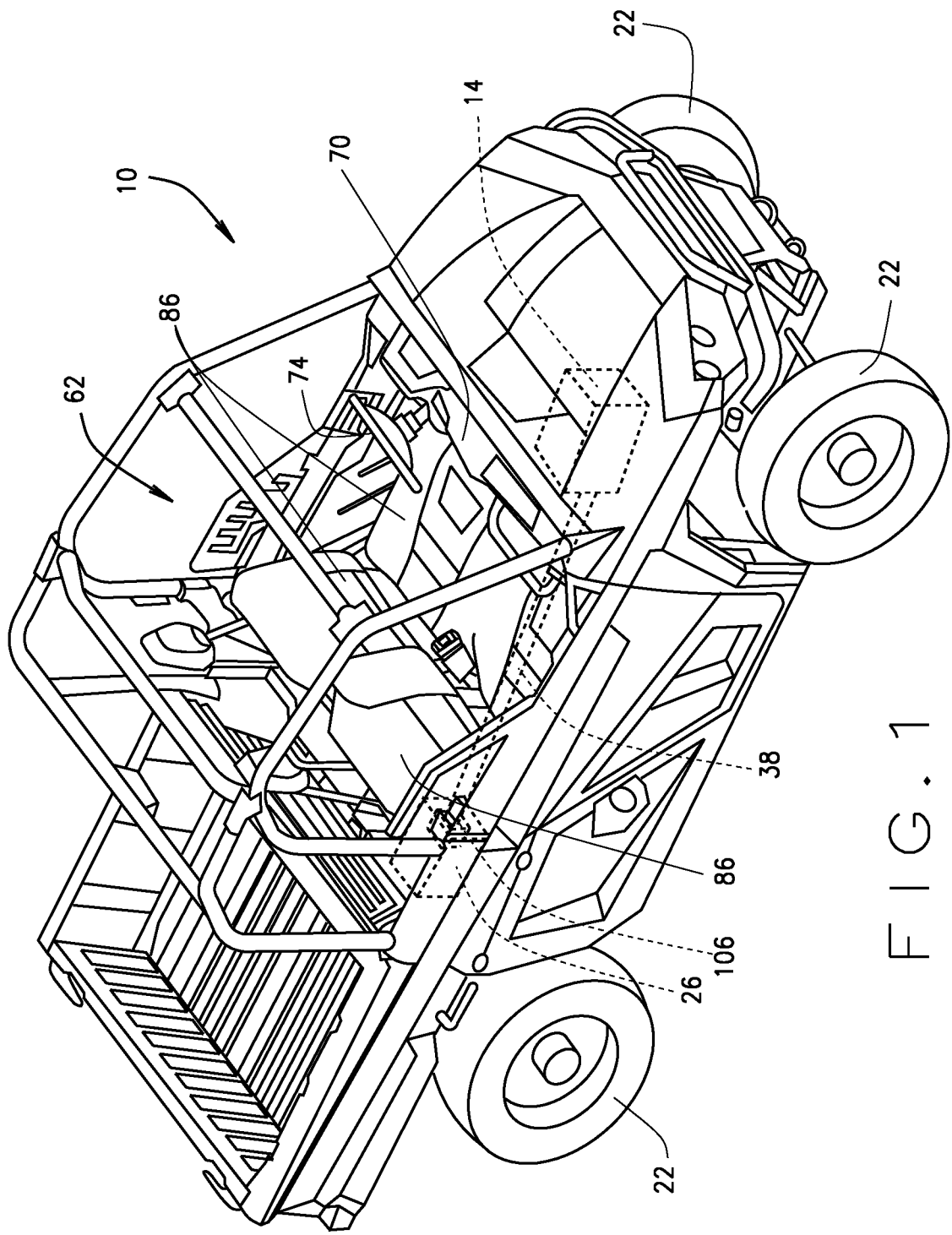
FIG. 1 is an is an isometric view of a vehicle including a transmission comprising a compound ratio low gear set, in accordance with various embodiments of the present disclosure.

The following description by way of example and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 2:
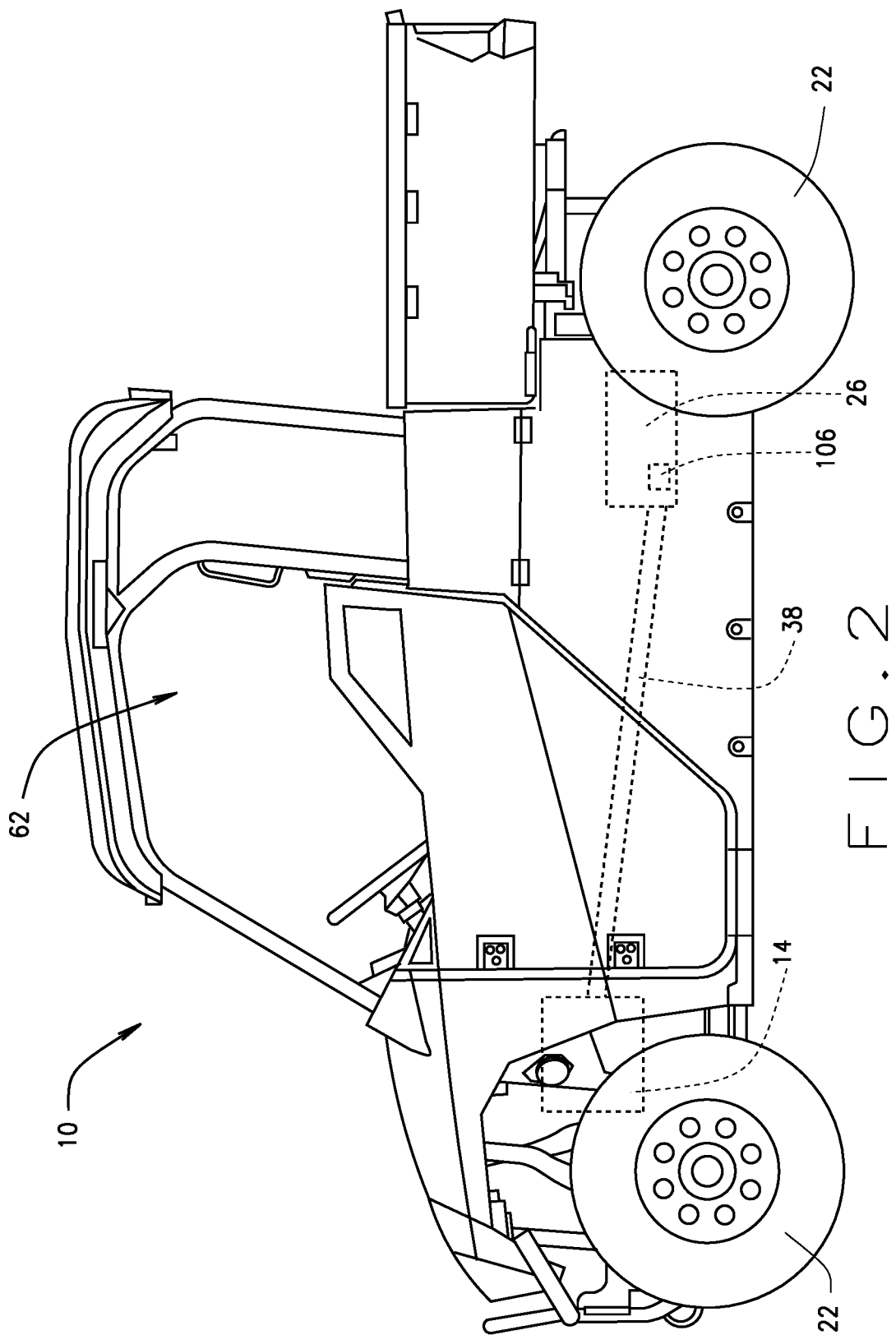
FIG. 2 is a side view of the vehicle shown in FIG. 1 including the transmission comprising the compound ratio low gear set, in accordance with various embodiments of the present disclosure.
Figure 3:
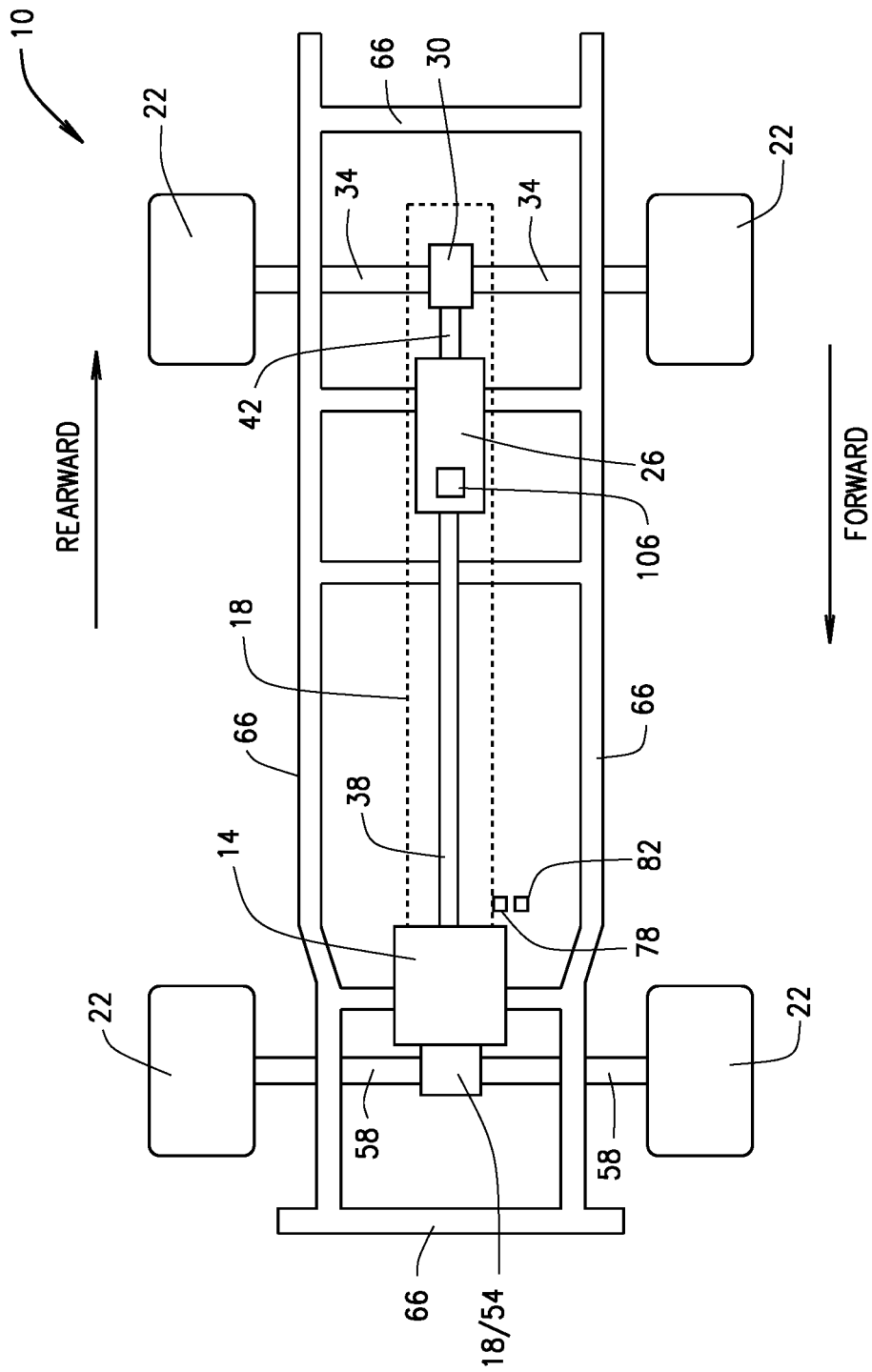
FIG. 3 is a block diagram of the vehicle shown in FIG. 1 including the transmission comprising the compound ratio low gear set, in accordance with various embodiments of the present disclosure.
Figure 4:
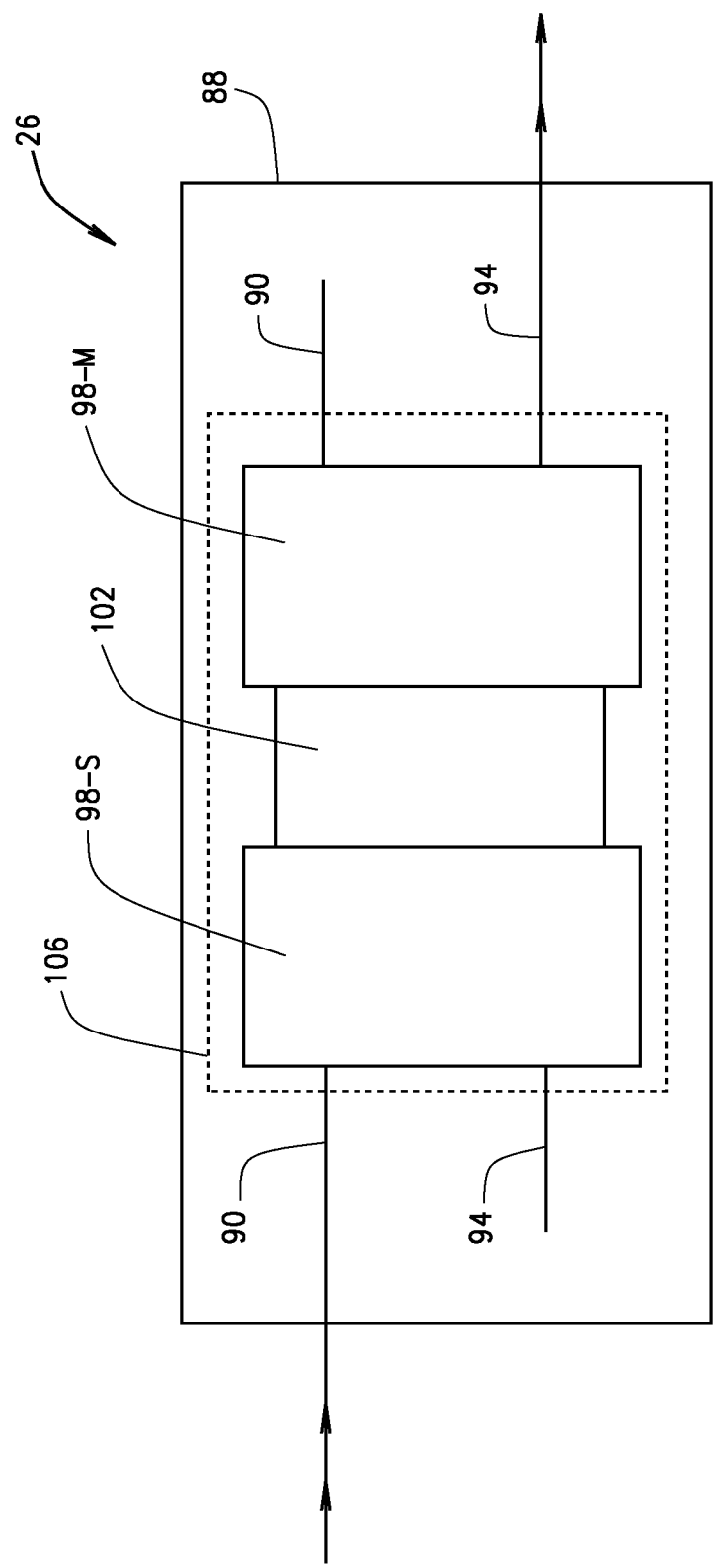
FIG. 4 is a block diagram of the transmission comprising the compound ratio low gear set shown in FIG. 1, in accordance with various embodiments of the present disclosure.

Referring to FIGS. 1, 2 and 3, the present disclosure provides a vehicle 10 comprising a prime mover 14 (e.g., an internal combustion engine and/or an electric motor) that generates and delivers power to a driveline 18 that is operatively connected to at least one wheel 22 to provide motive force to the vehicle 10. The vehicle 10 can be any vehicle, such as a truck, car, or sport utility vehicle, but will be described and illustrated herein, by way of example, as an off-road utility or other lightweight vehicle not designated for use on roadways, e.g., a maintenance vehicle, a cargo vehicle, a shuttle vehicle, a golf cart, an all-terrain vehicle (ATV), a utility task vehicle (UTV), a recreational off-highway vehicle (ROV), a side-by-side vehicle (SSV), a worksite vehicle, a buggy, a motorcycle, a snowmobile, a tactical vehicle, etc.

The driveline 18 includes a transmission 26 that is operatively connected to the prime mover 14. The transmission 26 can be operatively connected to the prime mover 14 via direct connection or via a first drive shaft 38 of the driveline 18. In various embodiments, the driveline 18 includes a rear differential or transaxle 30 (simply referred to herein as the rear differential 30) that is operatively connected to the transmission 26, and a rear axle 34 that is operatively connected to one or more wheel 22. The rear differential 30 can be operatively connected to the transmission 26 via direct connection or via a second driveshaft 42. The rear axle 34 can, for example, be either a split axle for an independent suspension system, or a one-piece axle, and remain within the scope of the present disclosure. In various embodiments, the driveline 18 can additionally or alternatively include a front differential or transaxle 54 (simply referred to herein as the front differential 54) that is operatively connected to the transmission 26, and a front axle 58 that is operatively connected to one or more wheel 22. The front differential 54 can be operatively connected to the transmission 26 via direct connection or via a power take off (not shown) connected to the transmission 26 and third drive shaft (not shown). The front axle 58 can, for example, be either a split axle for an independent suspension system, or a one-piece axle, and remain within the scope of the present disclosure. In various embodiments, the driveline 18 can include both the rear and front differentials 30 and 54 and their respective connections to the transmission 26 described above. Alternatively, in various embodiments, one of the rear and front differentials 30 and 54 and its respective connection to the transmission 26 may be omitted and remain within the scope of the disclosure.

The components of the driveline 18 described above by way of example, should not be considered as limiting. It is envisioned that the driveline 18 can include fewer or more components than described above and remain within the scope of the present disclosure. For example, in various embodiments, the driveline 18 can include one or more transfer case disposed between the transmission 26 and the rear differential and/or the front differentials 30 and/or 54, and remain within the scope of the present disclosure. Additionally, in various embodiments, the driveline 18 can include a clutch or torque converter between the prime mover 14 and the transmission 26, and remain within the scope of the present disclosure.

It is envisioned that the driveline 18 of the vehicle 10 of various embodiments can be configured to provide 2-wheel drive functionality and/or 4-wheel drive functionality to vehicle 10. Accordingly, based on whether the driveline 18 is configured as a 2-wheel drive driveline or a 4-drive driveline, the driveline 18 can comprise any or all of, individually or in any combination, the transmission 26, the rear differential 30, the rear axle 34, the front differential 54, front axle 58, the first driveshaft 38, the second driveshaft 42, the power take off (not shown) and the third driveshaft (not shown).

The vehicle 10 additionally includes a passenger compartment 62 supported by a chassis 66. The passenger compartment 62 generally includes: a dash console 70 that can include such things an On/Off key switch, a driver information display panel/screen, a forward/neutral/reverse selector, a 2-wheel drive/4-wheel drive selector, a differential lock/unlock selector, one or more small accessory storage pockets, a speedometer, various other gauges and/or instrumentation, a radio, and/or various other vehicle controls; a steering wheel 74 for use by the vehicle operator to control the directional movement of the vehicle 10; a brake pedal 78 for use by the vehicle operator to control slowing and stopping of the vehicle 10; the accelerator pedal 82 for use by the vehicle operator to control power delivered by the prime mover 14 to the wheel(s) 22 via the driveline 18; and one or more passenger seating structure 86 for supporting one or more passengers of the vehicle 10 (e.g., a driver and one or more non-drivers). The seating structure(s) 86 can be any suitable seating structure, for example, one or more row bench style seats, or one or more rows of side-by-side seats.

Referring now to FIGS. 1, 2, 3 and 4, the transmission 26 comprises a housing or case 88, an input shaft 90, an output shaft 94, a plurality of active gear sets 98 and a passive gear set 102. In various embodiments, the passive gear set 102 is selectably engageable with two of the active gear sets 98 such that the combination and interoperability of the two respective active gear sets 98 and the passive gear set 102 form or provide a compound ratio low gear set 106. As described below, the compound ratio gear set 106 provides high numeric compound ratio rotational speed reduction (e.g., a 7.46:1 reduction) (sometimes referred to as a low gear ratio) between the input shaft 90 and the output shaft 94.

The input shaft 90 is operably connected to the output shaft 94 by the plurality of active gear sets 98. Each active gear set 98 includes a pair of gears, wherein one of the gears is actively or fixedly mounted to (e.g., directly connected or affixed to, fixedly engaged with, or integrally formed with) one of the input shaft 90 or the output shaft 94, and the other gear of each active gear set 98 is selectably engageable with (e.g., engageable via sliding dog rings, sliding gears, synchronizers and/or clutches) the other of the input shaft 90 and the output shaft 94. The passive gear set 102 includes a pair of gears, wherein one of the gears is fixedly connected to (e.g., directly connected or affixed to, fixedly engaged with, or integrally formed with), or selectably engageable with, one gear of one of the active gear sets 98 (referred to herein as the compound ratio master gear set 98-M). Additionally, the other gear of the passive gear set 102 is fixedly connected to (e.g., directly connected or affixed to, fixedly engaged with, or integrally formed with), or selectably engageable with, one gear of another one of the active gear sets 98 (referred to herein as the compound ratio slave gear set 98-S). The transmission input shaft 90 is operatively connected to the prime mover 14 (e.g., via direct connection or via the first drive shaft 38 of the driveline 18) such that power generated by the prime mover 14 is delivered or transferred to the input shaft 90. The transmission output shaft 94 is operatively connected to the rear differential 30 and/or the front differential 54 (e.g., via direct connection and/or via the second driveshaft 42 and/or the third driveshaft (not shown)) such that power transferred from the input shaft is delivered or transferred to the wheel(s) 22.

As described above, in operation, the prime mover 14 generates and delivers power to the driveline 18. More particularly, the prime mover 14 generates and delivers power to the transmission input shaft 90, the transmission 26 then transfers power received from the prime mover 14 to the output shaft 94 via automatic or manual selective engagement of active gear sets 98 and the compound low ratio gear set 106, whereafter power is delivered to one or more wheel 22 via differentials 30 and/or 54. Each of the active gear sets 98 and the compound low ratio gear set 106 are structured and operable to provide a gear ratio that will increase or reduce rotational speed of the output shaft 94 relative to the rotational speed of the input shaft 90 based on the respective ratio. Additionally, as a function of power, the active gear sets 98 and the compound low ratio gear set 106 are also structured and operable to inversely increase or reduce the torque delivered by the output shaft 94 relative to the torque received from the prime mover 14 at the input shaft 90. As used herein power is equal to torque multiplied by angular velocity (e.g., $P(t)=\tau \cdot \omega$, wherein P(t) is power, $\tau$ is torque, $\omega$ is angular velocity). Angular velocity is also referred to herein as rotational speed (e.g., revolutions per minute (RPM)), for example, rotational speed of the input and output shafts 90 and 94. The gear ratios will be expressed herein as the ratio of the rotational speed of the input shaft 90 (RPMIS) with respect to the rotational speed of the output shaft 94 (RPMOS), for example, RPMIS:RPMOS. For example, a gear ratio of 3:1 represents that for every three rotations of the input shaft 90, the output shaft 94 will rotate once.

The active gear sets 98 of the transmission 26 comprise gear sets commonly referred to as first gear, second gear, third gear, etc., that are utilized when the vehicle 10 is driven over non-challenging terrain such as established roads, paths, trails, etc., and open land having non-extreme terrestrial landscape conditions. As described above, the passive gear set 102 of the transmission 26 is implemented in combination with two active gear sets 98 (e.g., the compound ratio master and slave gear sets 98-M and 98-S) to form the compound ratio gear set 106. The compound ratio gear set 106 (also referred to herein as the 'granny gear' of the transmission 26) is structured and operable to be utilized when the vehicle 10 is driven over challenging terrain where it is desired that transmission output shaft 94 deliver low rotational speed and high torque to the wheel(s) 22. For example, the compound ratio gear set 106 can be selected, automatically or manually, when the vehicle 10 is driving over difficult terrain, e.g., muddy terrain, snowy terrain, rocky terrain, undulating terrain, terrain with steep hills, etc., or when the vehicle 10 is used to tow another vehicle or other object.

More particularly, the transmission 26 can comprise two or more active gear sets 98, and the passive gear set 102. Each active gear set 98 is structured and operable to, upon automatic or manual selection of one the respective active gear sets 98, provide a desired reduction or increase in the rotational speed of the output shaft 94 relative to the rotational speed of the input shaft 90. The passive gear set 102 is structured and operable to, upon automatic or manual selection of the compound ratio gear set 106, provide a gear ratio that, when combined with the gear ratios of the compound ratio master and slave gear sets 98-M and 98-S, will reduce the rotational speed of the output shaft 94 relative to the rotational speed of the input shaft 90 at a numerically greater ratio than any of the active gear sets 98 independently. That is, the product of the ratios of the compound ratio master gear set 98-M, the compound ratio slave gear set 98-S, and the passive gear set 102 will generate or produce a resulting reduction in rotational speed and increase in torque output by the output shaft 94 that are greater than the rotational speed reduction and torque increase generated or produced by any of the selectable active gear sets 98 independently. Therefore, when selectably engaged, the compound ratio low gear set 106 is structured and operable to provide a high numeric compound ration gear reduction, i.e., a low gear ratio (e.g., 7.46:1) between the input shaft 90 and the output shaft 94, such that the vehicle 10 can travel slowly with high torque delivered to the wheel(s) 22 to negotiate difficult terrain.

For example, if the compound ratio master gear set 98-M has a gear ratio of 4:1, the compound ratio slave gear set 98 has a gear ratio of 3:1, and the passive gear set 102 has a gear ratio of 2:1, the resultant reduction in rotational speed and increase in torque of the output shaft 94 relative to the input shaft would be the product of the ratios, 24:1 (e.g., $4 \cdot 3 \cdot 2=24$). As another example, if the compound ratio master gear set 98-M has a gear ratio of 5:1, the compound ratio slave gear set 98-S has a gear ratio of 2.5:1, and the passive gear set 102 has a gear ratio of 0.6:1, the resultant reduction in rotational speed and increase in torque of the output shaft 94 relative to the input shaft would be the product of the ratios, 7.5:1 (e.g., $5 \cdot 2.5 \cdot 0.6=7.5$). As another example, if the compound ratio master gear set 98-M has a gear ratio of 3.5:1, the compound ratio slave gear set 98-S has a gear ratio of 2:1, and the passive gear set 102 has a gear ratio of 1.75:1, the resultant reduction in rotational speed and increase in torque of the output shaft 94 relative to the input shaft would be the product of the ratios, 12.25 (e.g., $3.5 \cdot 2 \cdot 1.75=12.25$). The compound ratio master gear set 98-M and the compound ratio slave gear set 98-S can be any two active gear sets 98 of the transmission 26 that have gear ratios that will provide the desired compound ratio gear set ratio when multiplied by the passive gear set ratio. More specifically, the passive gear set 102 can be structured to have any gear ratio that, when multiplied by the gear ratios of the compound ratio master and slave gear sets 98-M and 98-S, will provide the desired compound ratio gear set ratio.

Figure 5:
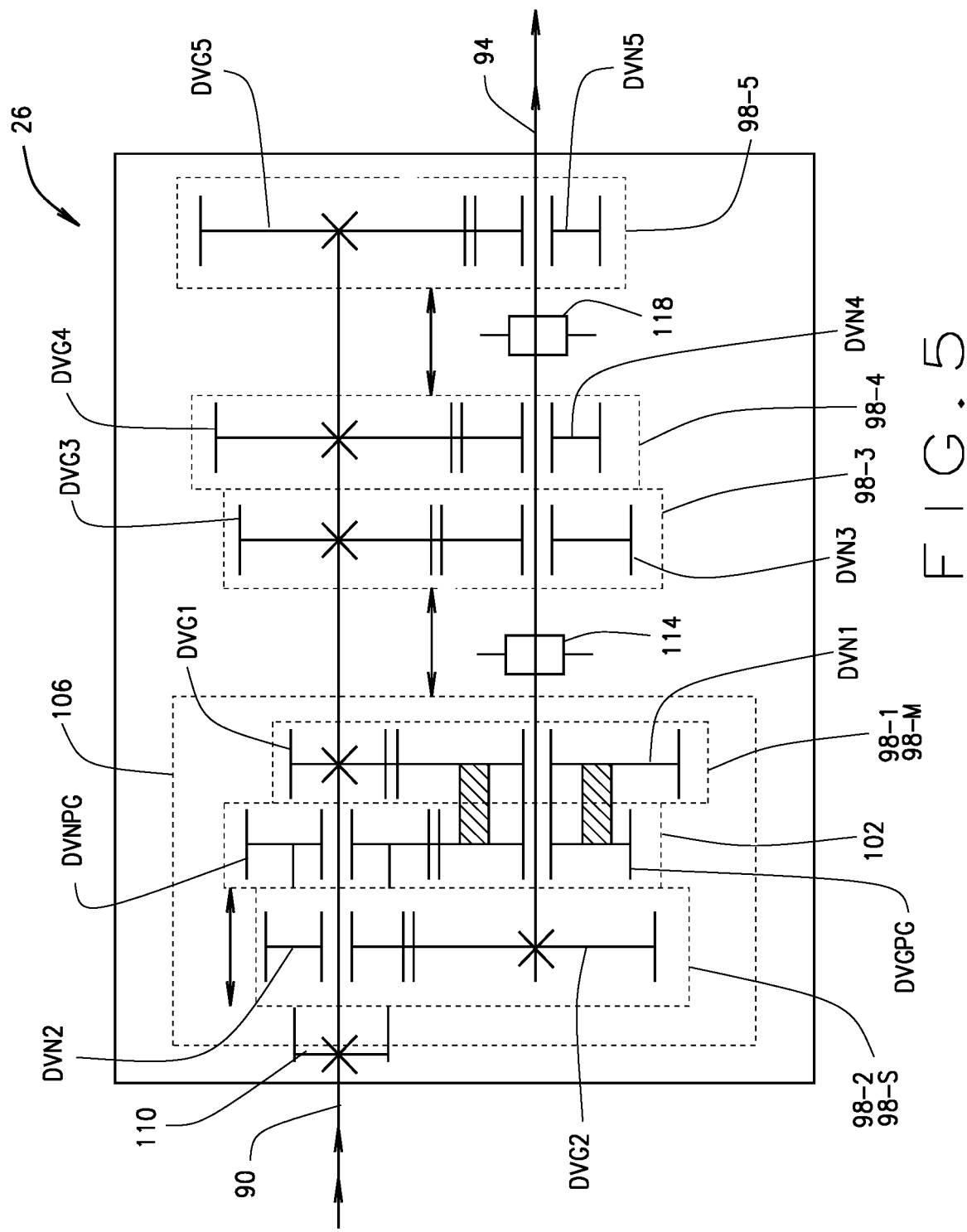
FIG. 5 is a schematic of the transmission comprising the compound ratio low gear set shown in FIG. 1, in accordance with various embodiments of the present disclosure.

Referring now to FIG. 5, in various embodiments, the transmission 26 can, for example, comprise a first speed active gear set 98-1 having a first gear ratio, a second speed active gear set 98-2 having a second gear ratio, and a third speed active gear set 98-3 having a third gear ratio, a fourth speed active gear set 98-4 having a fourth gear ratio, a fifth speed active gear set 98-5 having a fifth gear ratio, a passive gear set 102 having a sixth gear ratio, and a compound ratio gear set 106 comprised of the first speed active gear set 98-1, the second speed active gear set 98-2 and the passive gear set 102 having a compound gear ratio. In the example embodiments illustrated in FIG. 5, the first speed active gear set 98-1 is the compound ratio master gear set 98-M and the second speed active gear set 98-2 is the compound ratio slave gear set 98-S.

As described above, each active gear set 98 includes a pair of gears, wherein one of the gears is fixedly mounted to one of the input shaft 90 or the output shaft 94. These gears are referred to herein as the driving gear (e.g., the DVG gear) of the respective active gear set 98. The other gear of each active gear set 98 is free spinning on, and selectably engageable with, the other of the input shaft 90 and the output shaft 94. These gears are referred to herein as the driven gear (e.g., the DVN gear) of the respective active gear set 98. For example, as illustrated in FIG. 5, in various embodiments: 1) the driving gear DVG1 of the first speed active gear set 98-1 is fixedly mounted to the input shaft 90, and the driven gear DVN1 of the first speed active gear set 98-1 is selectably engageable with the output shaft 94; 2) the driving gear DVG2 of the second speed active gear set 98-2 is fixedly mounted to the output shaft 94, and the driven gear DVN2 of the second speed active gear set 98-2 is selectably engageable with the input shaft 90; 3) the driving gear DVG3 of the third speed active gear set 98-3 is fixedly mounted to the input shaft 90, and the driven gear DVN3 of the third speed active gear set 98-3 is selectably engageable with the output shaft 94; 4) the driving gear DVG4 of the fourth speed active gear set 98-4 is fixedly mounted to the input shaft 90, and the driven gear DVN4 of the fourth speed active gear set 98-4 is selectably engageable with the output shaft 94; and 5) the driving gear DVG5 of the fifth speed active gear set 98-5 is fixedly mounted to the input shaft 90, and the driven gear DVN5 of the fifth speed active gear set 98-5 is selectably engageable with the output shaft 94.

As also described above, the passive gear set 102 includes a pair of gears, wherein one of the gears thereof is fixedly connected to, or selectably engageable with, one of the gears of the compound ratio master gear set 98-M. This gear is referred to herein as the driving gear DVGPG of the passive gear set 102. The other gear of the passive gear set 102 is fixedly connected to, or selectably engageable with, one of the gears of compound ratio slave gear set 98-S. This gear is referred to herein as the driven gear DVNPG of the passive gear set 102. For example, as illustrated in FIG. 5, in various embodiments, the driving gear DVGPG of the passive gear set 102 is fixedly connected to, or integrally formed with, the driven gear DVN1 of the first speed/master gear set 98-1/98-M, and the driven gear DVNPG of the passive gear set 102 is selectably engageable with (e.g., engageable via sliding dog rings, sliding gears, synchronizers and/or clutches) the driven gear DVN2 of the second speed/slave gear set 98-2/98-S.

In the embodiments illustrated in FIG. 5, the transmission 26 additionally includes a second speed fixed dog ring 110, a first-third speed sliding dog ring 114 and a fourth-fifth speed sliding dog ring 118. The second speed fixed dog ring 110 is fixedly mounted to the input shaft 90 and is structured and operable to engage with the driven gear DVN2 of the second speed active gear set 98-2. The driven gear DVN2 of the second speed active gear set 98-2 is slidingly mounted to the input shaft 90 and is structured and operable to selectably engage with the second speed fixed dog ring 110 when the second speed active gear set 98-2 is selected to provide the second gear ratio (also referred to herein as configuring or shifting the transmission 26 into second gear), and selectively engage with the driven gear DVNPG of the passive gear set 102 when the compound ratio gear set 106 is selected to provide the compound gear ratio (also referred to herein as configuring or shifting the transmission 26 into granny gear). Particularly, when the driven gear DVN2 of the second speed active gear set 98-2 engages with second speed fixed dog ring 110, the driven gear DVN2 of the second speed active gear set 98-2 becomes operatively engaged with (e.g., temporarily fixedly engaged with) the input shaft 90 such that power delivered to the input shaft 90 is transferred to the output shaft 94 through the second speed active gear set 98-2, thereby providing the second gear ratio between the input and output shafts 90 and 94.

Additionally, when the driven gear DVN2 of the second speed active gear set 98-2 (also referred to herein as the driven gear DVN2 of the compound ratio slave gear set 98-S) engages with the driven gear DVNPG of the passive gear set 102, the first speed active gear set 98-1, the passive gear set 102, and the second speed active gear set 98-2 become operatively connected to each other via the fixed connection of the passive gear set driving gear DVGPG to the first speed active gear set driven gear DVN1, thereby forming the compound ratio gear set 106. In such instances, the compound ratio gear set 106 is fixedly connected to the input shaft 90 at the first speed active gear set driving gear DVG1 (also referred to herein as the compound ratio master gear set driving gear DVG1) and fixedly connected to the output shaft 94 at the second speed active gear set driving gear DVG2 (also referred to herein as the compound ratio slave gear set driving gear DVG2). Therefore, power delivered to the input shaft 90 is transferred to the output shaft 94 through the compound ratio gear set 106, thereby providing the compound gear ratio between the input and output shafts 90 and 94.

Hence, in the example embodiments illustrated in FIG. 5, the second speed active gear set driven gear DVN2 has three defined positions. Specifically, the second speed active gear set driven gear DVN2 has: 1) a neutral position wherein it is not engaged with either the second speed fixed dog ring 110 or the passive gear set driven gear DVNPG; 2) a second gear position wherein it is engaged with the second speed fixed dog ring 110 to configure the transmission 26 in second gear; and 3) a granny gear position wherein it is engaged with the passive gear set driven gear DVNPG to form the compound ratio gear set 106 and configure the transmission 26 in granny gear.

When the transmission 26 is in the granny gear configuration, power flows from the input shaft 90 into the compound ratio master gear set driving gear DVG1 (e.g., the first speed active gear set driving gear DVG1) which is fixed to the input shaft 90. From the compound ratio master gear set driving gear DVG1 power flows into the compound ratio master gear set driven gear DVN1 (e.g., the first speed active gear set driven gear DVN1) and then into the passive gear set driving gear DVGPG which is fixed to the compound ratio master gear set driven gear DVN1. Power then flows from the passive gear set driving gear DVGPG the passive gear set driven gear DVNPG. Since the compound ratio slave gear set driven gear DVN2 (e.g., the second speed active gear set driven gear DVN2) is engaged with the passive gear set driven gear DVNPG, power flows through the compound ratio slave gear set driven gear DVN2 into the compound ratio slave gear set driving gear DVG2 (e.g., the second speed active gear set driving gear DVG2) and then out the output shaft 94. Hence, in the granny gear configuration power flows through three sets of gears, namely the compound ratio master gear set 98-M (e.g., the first speed active gear sets 98-1), the compound ratio slave gear set 98-M (e.g., the second speed active gear set 98-2) and the passive gear set 102, which provides a large reduction in rate of rotation between the input and output shafts 90 and 94. For example, with a compound ratio master gear set 98-M gear ratio of 3.17:1, a passive gear set 102 ratio of 3:1, and a compound ratio slave gear set 98-S gear ratio of 2.31:1, the total rotational speed reduction for the compound ratio gear set 106 would be $3.17 \cdot 3.0 \cdot 2.31 \approx 22:1$.

It is envisioned that in various embodiments, the second speed active gear set driven gear DVN2 is not slidingly mounted on input shaft 90, but is rather only free spinning on the input shaft 90. In such instances, the transmission 26 can further include a sliding dog ring (not shown) that is structured and operable to operably engage the second speed active gear set driven gear DVN2 with the input shaft 90, and another sliding dog ring (not shown) that is structured and operable to engage the passive gear set driven gear DVNPG with the driven gear DVN2 of the second speed active gear set 98-2, to thereby form the compound ratio gear set 106. Additionally, it is envisioned that in various embodiments, that the transmission 26 can be configured such that one or more of the third speed active gear set driven gear DVN3, and/or the fourth speed active gear set driven gear DVN4, and/or the fifth speed active gear set driven gear DVN5, can be slidingly mounted to the output shaft 94 and engageable with stationary dog rings (as described above with regard to the second speed active gear set driven gear DVN2).

The first-third speed sliding dog ring 114 is slidingly mounted to the output shaft 94 (e.g., via a splined engagement) and is structured and operable to selectably engage with the driven gear DVN1 of the first speed active gear set 98-1 and with the driven gear DVN3 of the third speed active gear set 98-3. Particularly, the first-third speed sliding dog ring 114 is structured and operable to engage with the driven gear DVN1 of the first speed active gear set 98-1 when the first speed active gear set 98-1 is selected to provide the first gear ratio (also referred to herein as configuring or shifting the transmission 26 into first gear), and to engage with the driven gear DVN3 of the third speed active gear set 98-3 when the third speed active gear set 98-3 is selected to provide the third gear ratio (also referred to herein as configuring or shifting the transmission 26 into third gear). More particularly, first-third speed sliding dog ring 114 is slidingly mounted to the output shaft 94 (e.g., via a splined engagement) such that when the first-third speed sliding dog ring 114 engages with first speed active gear set driven gear DVN1, the first speed active gear set driven gear DVN1 becomes operatively engaged with the output shaft 94 such that power delivered to the input shaft 90 is transferred to the output shaft 94 through the first speed active gear set 98-1, thereby providing the first gear ratio between the input and output shafts 90 and 94. In various embodiments, the operative engagement of the first speed active gear set driven gear DVN1 with the output shaft 94 is established via a splined engagement of the first speed active gear set driven gear DVN1 with the first-third speed sliding dog ring 114 and a splined engagement of the first-third speed sliding dog ring 114 with the output shaft 94. Additionally, first-third speed sliding dog ring 114 is slidingly mounted to the output shaft 94 such that when the first-third speed sliding dog ring 114 engages with third speed active gear set driven gear DVN3, the third speed active gear set driven gear DVN3 becomes operatively engaged with the output shaft 94 such that power delivered to the input shaft 90 is transferred to the output shaft 94 through the third speed active gear set 98-3, thereby providing the third gear ratio between the input and output shafts 90 and 94. In various embodiments, the operative engagement of the third speed active gear set driven gear DVN3 with the output shaft 94 is established via a splined engagement of the third speed active gear set driven gear DVN3 with the first-third speed sliding dog ring 114 and a splined engagement of the first-third speed sliding dog ring 114 with the output shaft 94.

The fourth-fifth speed sliding dog ring 118 is slidingly mounted to the output shaft 94 (e.g., via a splined engagement) and is structured and operable to selectably engage with the driven gear DVN4 of the fourth speed active gear set 98-4 and with the driven gear DVN5 of the fifth speed active gear set 98-5. Particularly, the fourth-fifth speed sliding dog ring 118 is structured and operable to engage with the driven gear DVN4 of the fourth speed active gear set 98-4 when the fourth speed active gear set 98-4 is selected to provide the fourth gear ratio (also referred to herein as configuring or shifting the transmission 26 into fourth gear), and to engage with the driven gear DVN5 of the fifth speed active gear set 98-5 when the fifth speed active gear set 98-5 is selected to provide the fifth gear ratio (also referred to herein as configuring or shifting the transmission 26 into fifth gear). More particularly, fourth-fifth speed sliding dog ring 118 is slidingly mounted to the output shaft 94 (e.g., via a splined engagement) such that when the fourth-fifth speed sliding dog ring 118 engages with fourth speed active gear set driven gear DVN4, the fourth speed active gear set driven gear DVN4 becomes operatively engaged with the output shaft 94 such that power delivered to the input shaft 90 is transferred to the output shaft 94 through the fourth speed active gear set 98-1, thereby providing the fourth gear ratio between the input and output shafts 90 and 94. In various embodiments, the operative engagement of the fourth speed active gear set driven gear DVN4 with the output shaft 94 is established via a splined engagement of the fourth speed active gear set driven gear DVN4 with the fourth-fifth speed sliding dog ring 118 and a splined engagement of the fourth-fifth speed sliding dog ring 118 with the output shaft 94.

Additionally, fourth-fifth speed sliding dog ring 118 is slidingly mounted to the output shaft 94 (e.g., via a splined engagement) such that when the fourth-fifth speed sliding dog ring 118 engages with fifth speed active gear set driven gear DVN5, the fifth speed active gear set driven gear DVN5 becomes operatively engaged with the output shaft 94 such that power delivered to the input shaft 90 is transferred to the output shaft 94 through the fifth speed active gear set 98-5, thereby providing the fifth gear ratio between the input and output shafts 90 and 94. In various embodiments, the operative engagement of the fifth speed active gear set driven gear DVN5 with the output shaft 94 is established via a splined engagement of the fifth speed active gear set driven gear DVN5 with the fourth-fifth speed sliding dog ring 118 and a splined engagement of the fourth-fifth speed sliding dog ring 118 with the output shaft 94.

Figure 6:
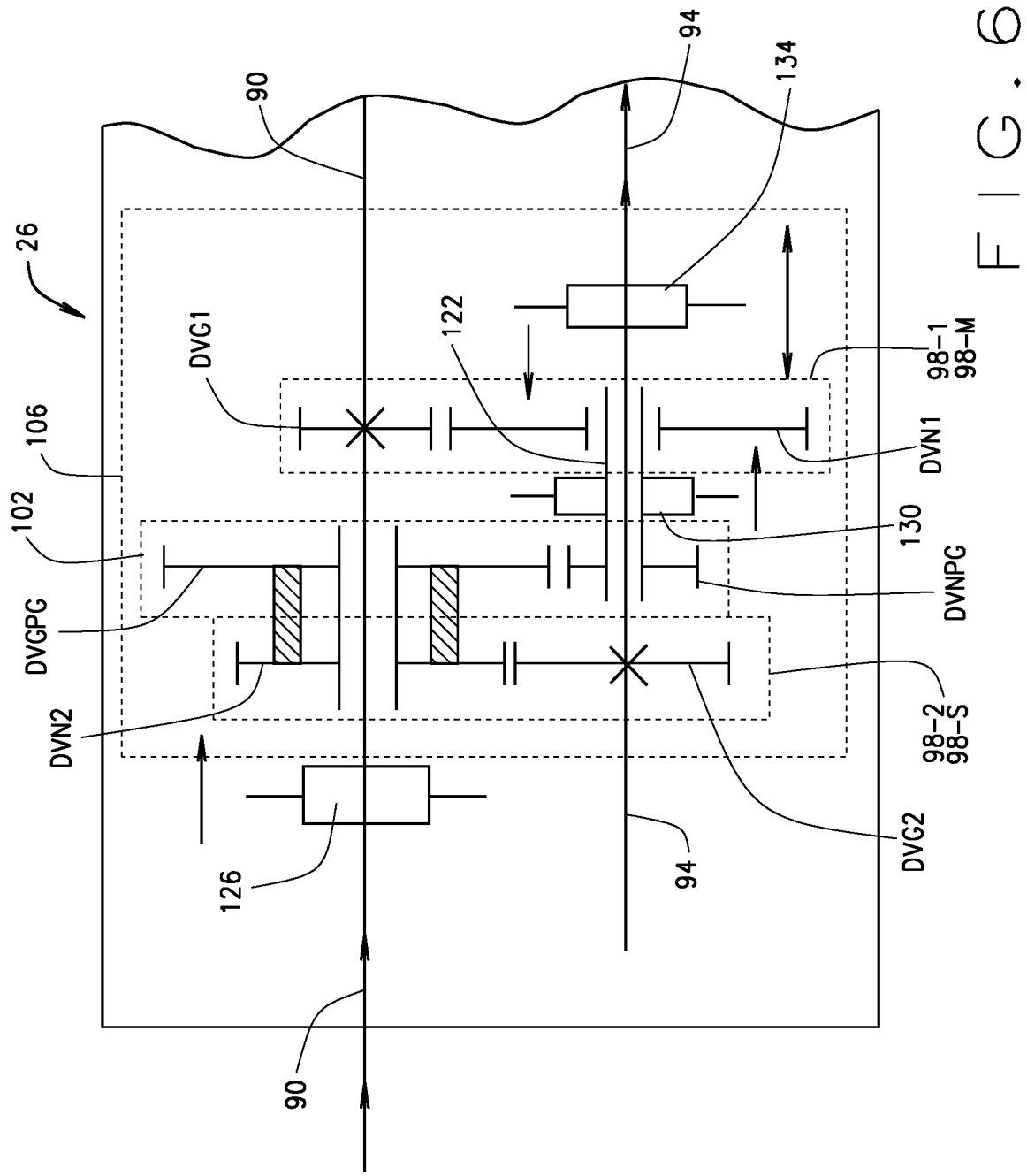
FIG. 6 is a schematic of a portion of the transmission comprising the compound ratio low gear set shown in FIG. 1, in accordance with various other embodiments of the present disclosure.

FIG. 6 is a schematic of a portion of the transmission 26 comprising the compound ratio low gear set 106, in accordance with various other embodiments of the present disclosure. FIG. 6 only illustrates the portion of the transmission 26 that includes the compound ratio low gear set 106. The transmission 26 illustrated by way of example in FIG. 6 may include only the active gear sets 98 shown or it can include one or more additional active gear sets 98, such as the five active gear sets illustrated by way of example in FIG. 5, or more (e.g., a sixth or seventh or more active gear set) and remain within the scope of the present disclosure. As illustrated in FIG. 6, in various embodiments, the transmission 26 can comprises the first speed active gear set 98-1 having a first gear ratio, the second speed active gear set 98-2 having a second gear ratio, a passive gear set 102 having a third gear ratio, and the compound ratio gear set 106 comprised of the first speed active gear set 98-1, the second speed active gear set 98-2 and the passive gear set 102 having a compound gear ratio. In the example embodiments illustrated in FIG. 6, the first speed active gear set 98-1 is the compound ratio master gear set 98-M and the second speed active gear set 98-2 is the compound ratio slave gear set 98-S. In such embodiments: 1) the driving gear DVG2 of the second speed active gear set 98-2 is fixedly mounted to the output shaft 94, and the driven gear DVN2 of the second speed active gear set 98-2 is selectably engageable with the input shaft 90; 2) the driving gear DVGPG of the passive gear set 102 is fixedly connected to, or integrally formed with, the driven gear DVN2 of the second speed/master gear set 98-2/98-S, and the driven gear DVNPG of the passive gear set 102 includes an elongated shaft 122 and is selectably engageable with (e.g., engageable via sliding dog rings, sliding gears, synchronizers and/or clutches) with the output shaft 94; and 3) the driving gear DVG1 of the first speed active gear set 98-1 is fixedly mounted to the input shaft 90, and the driven gear DVN1 of the first speed active gear set 98-1 is selectably engageable with (e.g., engageable via sliding dog rings, sliding gears, synchronizers and/or clutches) the elongated shaft 122 of the passive gear set driven gear DVNPG.

In the various embodiments illustrated in FIG. 6, the transmission 26 additionally includes a second speed sliding dog ring 126, a passive gear sliding dog ring 130, and a first speed sliding dog ring 134. The second speed sliding dog ring 126 is slidingly mounted to the input shaft 90 (e.g., via a splined engagement) and is structured and operable to selectably engage with the driven gear DVN2 of the second speed active gear set 98-2. Particularly, the second speed sliding dog ring 126 is structured and operable to engage with the driven gear DVN2 of the second speed active gear set 98-2 when the second speed active gear set 98-2 is selected to provide the second gear ratio (also referred to herein as configuring or shifting the transmission 26 into second gear). More particularly, the second speed sliding dog ring 126 of such embodiments is slidingly mounted to the input shaft 90 such that when the second speed sliding dog ring 126 engages with second speed active gear set driven gear DVN2, the second speed active gear set driven gear DVN2 becomes operatively engaged with the input shaft 90 such that power delivered to the input shaft 90 is transferred to the output shaft 94 through the second speed active gear set 98-2, thereby providing the second gear ratio between the input and output shafts 90 and 94. In various embodiments, the operative engagement of the second speed active gear set driven gear DVN2 with the input shaft 90 is established via a splined engagement of the second speed active gear set driven gear DVN2 with the second speed sliding dog ring 126 and a splined engagement of the second speed sliding dog ring 126 with the input shaft 90.

The passive gear sliding dog ring 130 is slidingly mounted to the elongated shaft 122 of the driven gear DVNPG of the passive gear set 102 (e.g., via a splined engagement) and is structured and operable to selectably engage the passive gear set driven gear DVNPG with the driven gear DVN1 of the first speed active gear set 98-1. Particularly, the passive gear sliding dog ring 130 is structured and operable to engage with the driven gear DVN1 of the first speed active gear set 98-1 when the compound ratio gear set 106 is selected to provide the compound gear ratio (also referred to herein as configuring or shifting the transmission 26 into granny gear). More particularly, when the passive gear sliding dog ring 130 engages with the driven gear DVN1 of the first speed active gear set 98-1, the first speed active gear set driven gear DVN1 becomes operatively engaged with the passive gear set driven gear DVNPG such that the first speed active gear 98-1, the passive gear set 102, and the second speed active gear set 98-2 become operatively connected to each other via the fixed connection of the passive gear set driving gear DVGPG to the second speed active gear set driven gear DVN2, thereby forming the compound ratio gear set 106. In various embodiments, the operative engagement of the passive gear set driven gear DVNPG with first speed active gear set driven gear DVN1 is established via a splined engagement of the passive gear sliding dog ring 130 with the first speed active gear set driven gear DVN1 and with the elongated shaft 122 of passive gear set driven gear DVNPG. In such instances, the compound ratio gear set 106 is fixedly connected to the input shaft 90 at the first speed active gear set driving gear DVG1 (also referred to herein as the compound ratio master gear set driving gear DVG1) and fixedly connected to the output shaft 94 at the second speed active gear set driving gear DVG2 (also referred to herein as the compound ratio slave gear set driving gear DVG2). Therefore, power delivered to the input shaft 90 is transferred to the output shaft 94 through the compound ratio gear set 106, thereby providing the compound gear ratio between the input and output shafts 90 and 94.

When the transmission 26 is in the granny gear configuration, power flows from the input shaft 90 into the compound ratio master gear set driving gear DVG1 (e.g., the first speed active gear set driving gear DVG1) which is fixed to the input shaft 90. From the compound ratio master gear set driving gear DVG1 power flows into the compound ratio master gear set driven gear DVN1 (e.g., the first speed active gear set driven gear DVN1) and then into the passive gear set driving gear DVGPG, which is operably connected to the compound ratio master gear set driven gear DVN1. Power then flows from the passive gear set driving gear DVGPG to the passive gear set driven gear DVNPG. Since the passive gear set driving gear DVGPG is fixedly connected to the compound ratio slave gear set driven gear DVN2 (e.g., the second speed active gear set driven gear DVN2), power flows through the compound ratio slave gear set driven gear DVN2 into the compound ratio slave gear set driving gear DVG2 (e.g., the second speed active gear set driving gear DVG2) and then out the output shaft 94.

Hence, in the granny gear configuration power flows through three sets of gears, namely the compound ratio master gear set 98-M (e.g., the first speed active gear sets 98-1), the compound ratio slave gear set 98-M (e.g., the second speed active gear set 98-2) and the passive gear set 102, which provides a large reduction in rate of rotation between the input and output shafts 90 and 94. For example, with a compound ratio master gear set 98-M gear ratio of 3.17:1, a passive gear set 102 ratio of 1.02:1, and a compound ratio slave gear set 98-S gear ratio of 2.31:1, the total rotational speed reduction for the compound ratio gear set 106 would be 3.17·1.02·2.31≈7.47:1.

The first speed sliding dog ring 134 is slidingly mounted to the output shaft 94 (e.g., via a splined engagement) and is structured and operable to selectably engage with the driven gear DVN1 of the first speed active gear set 98-1. Particularly, the first speed sliding dog ring 134 is structured and operable to engage with the driven gear DVN1 of the first speed active gear set 98-1 when the first speed active gear set 98-1 is selected to provide the first gear ratio (also referred to herein as configuring or shifting the transmission 26 into first gear). More particularly, the first speed sliding dog ring 134 is slidingly mounted to the output shaft 94 such that when the first speed sliding dog ring 134 engages with first speed active gear set driven gear DVN1, the first speed active gear set driven gear DVN1 becomes operatively engaged with the output shaft 94 such that power delivered to the input shaft 90 is transferred to the output shaft 94 through the first speed active gear set 98-1, thereby providing the first gear ratio between the input and output shafts 90 and 94. In various embodiments, the operative engagement of the first speed active gear set driven gear DVN1 with the output shaft 94 is established via a splined engagement of the first speed active gear set driven gear DVN1 with the first speed sliding dog ring 134 and a splined engagement of the first speed sliding dog ring 134 with the output shaft 94.

In various implementations, wherein the transmission 26 includes a third active gear set (e.g., a third speed active gear set) (not shown), the first speed dog ring 134 can be first-third speed dog ring that, in addition to operatively engaging the first speed gear set driven gear DRN1 with the output shaft 94, is structured and operable to operatively engage a gear of such a third active gear set with the output shaft 94 in the same fashion as the first-third speed sliding dog ring 114 described above with regard to FIG. 5.

Figure 7:
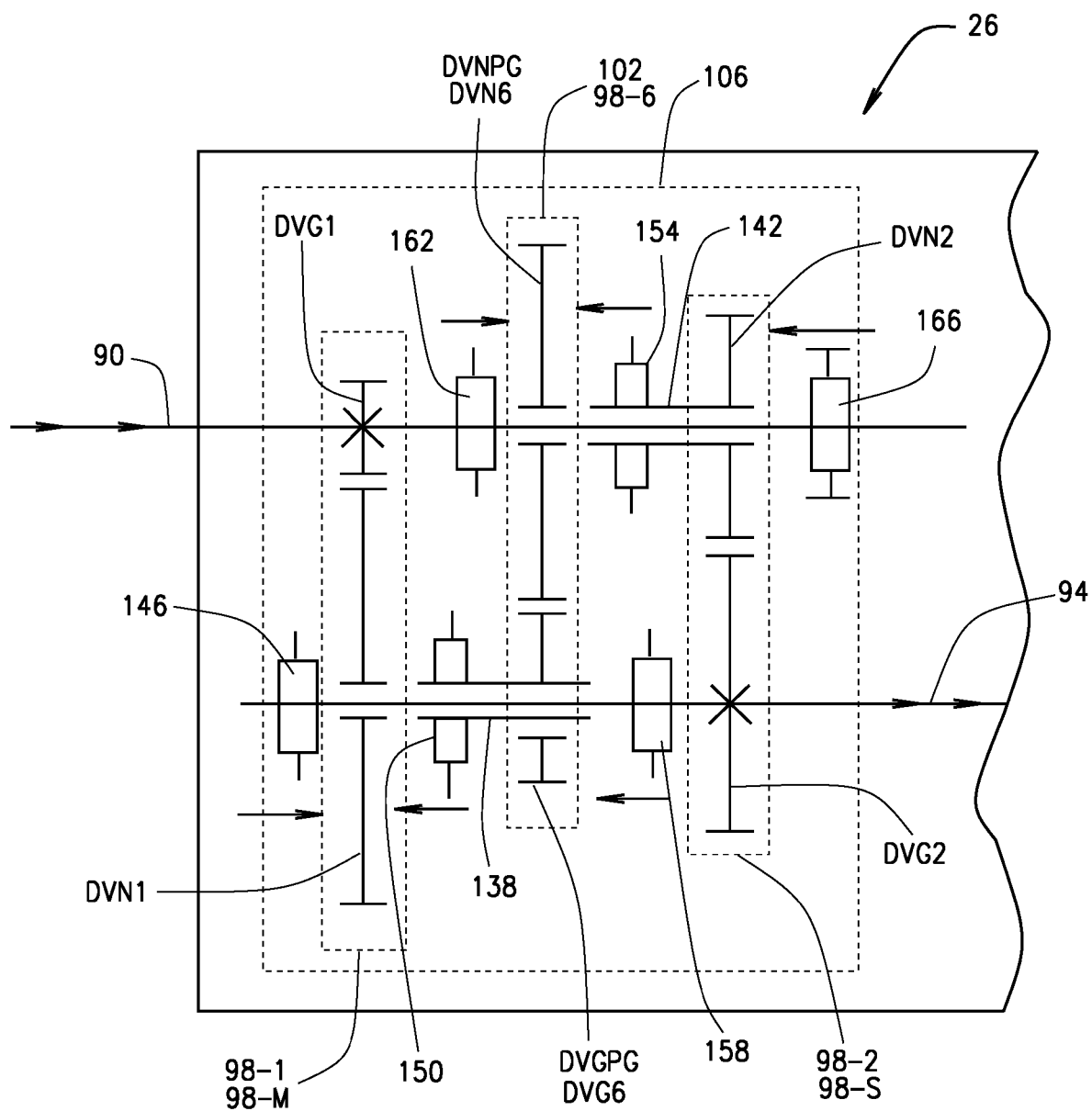
FIG. 7 is a schematic of a portion of the transmission comprising the compound ratio low gear set shown in FIG. 1, in accordance with yet various other embodiments of the present disclosure.

FIG. 7 is a schematic of a portion of the transmission 26 comprising the compound ratio low gear set 106, in accordance with yet other various embodiments of the present disclosure. FIG. 7 only illustrates the portion of the transmission 26 that includes the compound ratio low gear set 106. The transmission 26 illustrated by way of example in FIG. 7 may include only the active gear sets 98 shown or it can include one or more additional active gear sets 98, such as the five active gear sets illustrated by way of example in FIG. 5, or more (e.g., a sixth or seventh or more active gear set) and remain within the scope of the present disclosure.

As illustrated in FIG. 7, in various embodiments, the transmission 26 can comprises the first speed active gear set 98-1 having a first gear ratio, the second speed active gear set 98-2 having a second gear ratio, a passive gear set 102 having a third gear ratio, and the compound ratio gear set 106 comprised of the first speed active gear set 98-1, the second speed active gear set 98-2 and the passive gear set 102 having a compound gear ratio. In the example embodiments illustrated in FIG. 7, in addition to functioning and being utilized as part of the compound ratio gear set 106, the passive gear set 102 can co-function and be utilized as another active gear set 98 having different gear ratio than the other active gear sets 98 of the transmission 26. For example, in various instances, in addition to functioning and being utilized as part of the compound ratio gear set 106, the passive gear set 102 can co-function and be utilized a sixth speed active gear set 98-6 (or any other desired active gear set, e.g., third speed active gear set 98-3, fourth speed active gear set 98-4, fifth speed active gear set 98-5, etc.) to provide a sixth gear ratio (or other desired gear ratio, e.g., a third gear ratio, a fourth gear ration, a fifth gear ratio, etg.) between the input and output shafts 90 and 94. It should be understood that in such instances, although not shown, the transmission 26 will include the third speed active gear set (not shown) having a third gear ratio, a fourth gear set (not shown) having a fourth gear ratio, and a fifth gear set (not shown) having a fifth gear ratio.

In the example embodiments illustrated in FIG. 7, the first speed active gear set 98-1 is the compound ratio master gear set 98-M and the second speed active gear set 98-2 is the compound ratio slave gear set 98-S. In such embodiments: 1) the driving gear DVG1 of the first speed active gear set 98-1 is fixedly mounted to the input shaft 90, and the driven gear DVN1 of the first speed active gear set 98-1 is selectably engageable with the output shaft 94; 2) the driving gear DVGPG of the passive gear set 102 includes an elongated shaft 138 and is selectably engageable with (e.g., engageable via sliding dog rings, sliding gears, synchronizers and/or clutches) with the first speed active gear set driven gear DVN1, and the driven gear DVNPG of the passive gear set 102 is selectably engageable with the input shaft 90; and 3) the driving gear DVG2 of the second speed active gear set 98-2 is fixedly mounted to the output shaft 94, and the driven gear DVN2 of the second speed active gear set 98-2 includes an elongated shaft 142 and is selectably engageable with (e.g., engageable via sliding dog rings, sliding gears, synchronizers and/or clutches) with the passive gear set driven gear DVNPG.

In the various embodiments illustrated in FIG. 7, the transmission 26 additionally includes a first speed sliding dog ring 146, a first passive gear sliding dog ring 150, a second passive gear sliding dog ring 154, a first co-function gear sliding dog ring 158, a second co-function gear sliding dog ring 162, and a second speed sliding dog ring 166. The first speed sliding dog ring 146 is slidingly mounted to the output shaft 94 (e.g., via a splined engagement) and is structured and operable to selectably engage with the driven gear DVN1 of the first speed active gear set 98-1. Particularly, the first speed sliding dog ring 146 is structured and operable to engage with the driven gear DVN1 of the first speed active gear set 98-1 when the first speed active gear set 98-1 is selected to provide the first gear ratio (also referred to herein as configuring or shifting the transmission 26 into first gear). More particularly, the first speed sliding dog ring 146 is slidingly mounted to the output shaft 94 such that when the first speed sliding dog ring 146 engages with first speed active gear set driven gear DVN1, the first speed active gear set driven gear DVN1 becomes operatively engaged with the output shaft 90 such that power delivered to the input shaft 90 is transferred to the output shaft 94 through the first speed active gear set 98-1, thereby providing the first gear ratio between the input and output shafts 90 and 94. In various embodiments, the operative engagement of the first speed active gear set driven gear DVN1 with the output shaft 94 is established via a splined engagement of the first speed active gear set driven gear DVN with the first speed sliding dog ring 146 and a splined engagement of the first speed sliding dog ring 146 with the output shaft 94.

The second speed sliding dog ring 166 is slidingly mounted to the input shaft 90 (e.g., via a splined engagement) and is structured and operable to selectably engage with the driven gear DVN2 of the second speed active gear set 98-2. Particularly, the second speed sliding dog ring 166 is structured and operable to engage with the driven gear DVN2 of the second speed active gear set 98-2 when the second speed active gear set 98-2 is selected to provide the second gear ratio (also referred to herein as configuring or shifting the transmission 26 into second gear). More particularly, the second speed sliding dog ring 166 is slidingly mounted to the input shaft 90 such that when the second speed sliding dog ring 166 engages with second speed active gear set driven gear DVN2, the second speed active gear set driven gear DVN2 becomes operatively engaged with the input shaft 90 such that power delivered to the input shaft 90 is transferred to the output shaft 94 through the second speed active gear set 98-2, thereby providing the second gear ratio between the input and output shafts 90 and 94. In various embodiments, the operative engagement of the second speed active gear set driven gear DVN2 with the input shaft 90 is established via a splined engagement of the second speed active gear set driven gear DVN2 with the second speed sliding dog ring 166 and a splined engagement of the second speed sliding dog ring 166 with the input shaft 90.

The first passive gear sliding dog ring 150 is slidingly mounted to the elongated shaft 138 of the driving gear DVGPG of the passive gear set 102 (e.g., via a splined engagement) and is structured and operable to selectably engage the passive gear set driving gear DVGPG with the driven gear DVN1 of the first speed active gear set 98-1. Particularly, the first passive gear sliding dog ring 150 is structured and operable to engage with the driven gear DVN1 of the first speed active gear set 98-1 when the compound ratio gear set 106 is selected to provide the compound gear ratio (also referred to herein as configuring or shifting the transmission 26 into granny gear). More particularly, when the first passive gear sliding dog ring 150 engages with the driven gear DVN1 of the first speed active gear set 98-1, the first speed active gear set driven gear DVN1 becomes operatively engaged with the passive gear set driving gear DVGPG such that the first speed active gear set 98-1 becomes operatively connected to the passive gear set driving gear DVGPG. Additionally, the second passive gear sliding dog ring 154 is slidingly mounted to the elongated shaft 142 of the driven gear DVN2 of the second speed active gear set 98-2 (e.g., via a splined engagement) and is structured and operable to selectably engage the second speed active gear set driven gear DVN2 with the driven gear DVNPG of the passive gear set 102. Particularly, the second passive gear sliding dog ring 154 is structured and operable to engage with the driven gear DVNPG of the passive gear set 102 when the compound ratio gear set 106 is selected to provide the compound ratio (also referred to herein as configuring or shifting the transmission 26 into granny gear). More particularly, when the second passive gear sliding dog ring 154 engages with the driven gear DVNPG of passive gear set 102, the second speed active gear set driven gear DVN2 becomes operatively engaged with the passive gear set driven gear DVNPG such that the second speed active gear set 98-2 becomes operatively connected passive gear set driven gear DVNPG. Therefore, in such embodiments, to configure the transmission 26 into granny gear, the first passive gear sliding dog ring 150 is moved to operatively engage the first speed active gear set driven gear DVN1 (also referred to herein as the driven gear DVN1 of the compound ratio master gear set 98-M) with the passive gear set driving gear DVGPG, and the second passive gear sliding dog ring 154 is moved to operatively engage the second speed active gear set driven gear DVN2 (also referred to herein as the driven gear DVN2 of the compound ratio slave gear set 98-S) with the passive gear set driven gear DVNPG, thereby operably connecting together the first speed active gear 98-1, the passive gear set 102, and the second speed active gear set 98-2, thereby forming the compound ratio gear set 106.

In various embodiments, the operative engagement of the passive gear set driving gear DVGPG with first speed active gear set driven gear DVN1 is established via a splined engagement of the first passive gear sliding dog ring 150 with the first speed active gear set driven gear DVN1 and with the elongated shaft 138 of passive gear set driving gear DVGPG. Similarly, the operative engagement of the passive gear set driven gear DVNPG with second speed active gear set driven gear DVN2 is established via a splined engagement of the second passive gear sliding dog ring 154 with the elongated shaft 142 of the second speed active gear set driven gear DVN2 and with the passive gear set driven gear DVNPG. In such instances, the compound ratio gear set 106 is fixedly connected to the input shaft 90 at the first speed active gear set driving gear DVG1 (also referred to herein as the compound ratio master gear set driving gear DVG1) and fixedly connected to the output shaft 94 at the second speed active gear set driving gear DVG2 (also referred to herein as the compound ratio slave gear set driving gear DVG2). Therefore, power delivered to the input shaft 90 is transferred to the output shaft 94 through the compound ratio gear set 106, thereby providing the compound gear ratio between the input and output shafts 90 and 94.

When the transmission 26 is in the granny gear configuration, power flows from the input shaft 90 into the compound ratio master gear set driving gear DVG1 (e.g., the first speed active gear set driving gear DVG1) which is fixed to the input shaft 90. From the compound ratio master gear set driving gear DVG1 power flows into the compound ratio master gear set driven gear DVN1 (e.g., the first speed active gear set driven gear DVN1) and then into the passive gear set driving gear DVGPG, which is operably connected to the compound ratio master gear set driven gear DVN1 via the first passive gear sliding dog ring 150. Power then flows from the passive gear set driving gear DVGPG to the passive gear set driven gear DVNPG and into the compound ratio slave gear set driven gear DVN2 (e.g., the second speed active gear set driven gear DVN2), which is operably connected to the passive gear set driven gear DVNPG via the second passive gear sliding dog ring 154. Power then flow into the compound ratio slave gear set driving gear DVG2 (e.g., the second speed active gear set driving gear DVG2) and out the output shaft 94. Hence, in the granny gear configuration power flows through three sets of gears, namely the compound ratio master gear set 98-M (e.g., the first speed active gear sets 98-1), the compound ratio slave gear set 98-M (e.g., the second speed active gear set 98-2) and the passive gear set 102, which provides a large reduction in rate of rotation between the input and output shafts 90 and 94.

In the instances wherein the passive gear set 102 co-functions as another active gear set 98, the passive gear set 102 will be referred to herein as the sixth speed active gear set 98-6. However, such reference is only used as an example is not limiting. Particularly, in such instances, the passive gear set 102 can comprise any active gear set 98, for example, the third speed active gear set 98-3, the fourth speed active gear set 98-4, the fifth speed active gear set 98-5, etc., and remain with the scope of the present disclosure. In such instances, the first co-function gear sliding dog ring 158 is slidingly mounted to the output shaft 94 (e.g., via a splined engagement) and is structured and operable to selectably engage the sixth gear set driving gear DVG6 with output shaft 94. Particularly, the first co-function gear sliding dog ring 158 is structured and operable to engage with the driving gear DVG6 of the sixth speed active gear set 98-6 when the sixth speed active gear set 98-6 is selected to provide the sixth gear ratio (also referred to herein as configuring or shifting the transmission 26 into sixth gear). Additionally, the second co-function gear sliding dog ring 162 is slidingly mounted to the input shaft 90 (e.g., via a splined engagement) and is structured and operable to selectably engage the sixth speed active gear set driven gear DVN6 input shaft 90. Particularly, the second co-function gear sliding dog ring 162 is structured and operable to engage with the driven gear DVN6 of the sixth speed active gear set 98-6 when the sixth speed active gear set 98-6 is selected to provide the sixth gear ratio (also referred to herein as configuring or shifting the transmission 26 into sixth gear).

Therefore, in such embodiments, to configure the transmission 26 into sixth gear, the first co-function gear sliding dog ring 158 is moved to operatively engage the sixth speed active gear set driving gear DVG6 with the output shaft 94, and the second co-function gear sliding dog ring 162 is moved to operatively engage the sixth speed active gear set driven gear DVN2 with input shaft 90, thereby providing the sixth gear ratio between the input and output shafts 90 and 94. In various embodiments, the operative engagement of the sixth speed active gear set driving gear DVG6 with the output shaft 94 is established via a splined engagement of the sixth speed active gear set driving gear DVG6 with the first co-function gear sliding dog ring 158 and a splined engagement of the first co-function gear sliding dog ring 158 with the output shaft 94. Similarly, in various embodiments, the operative engagement of the sixth speed active gear set driven gear DVN6 with the input shaft 90 is established via a splined engagement of the sixth speed active gear set driven gear DVN6 with the second co-function gear sliding dog ring 162 and a splined engagement of the second co-function gear sliding dog ring 162 with the input shaft 90.

Referring now to FIG. 8, although generally only dog rings are shown in FIGS. 5, 6 and 7, in various embodiments, adjoining driving gears of active gear sets 98 can be used as dog rings to lock a driven gear of an adjacent active gear set 98 to the respective input or output shaft 90 or 94. For example, in various embodiments, it is envisioned that one of more of the active gear set 98 driving gears can be mounted to the respective input or output shaft 90 or 94 via splines such that the respective driving gear can slide on the respective input or output shaft 90 or 94 and function as a dog ring for one or more driven gears. For example, an alternative configuration to the transmission 26 shown in FIG. 7 is shown in FIG. 8, the second speed active gear set driving gear DVG2 can be fixed in rotation to the output shaft 94 (e.g., via a splined engagement), but is allowed to slide into one of three positions so that it can lock either: 1) the sixth speed active gear set driving gear DVG6 (e.g., the passive gear set driving gear DVGPG of the compound ratio gear set 106) to the output shaft 94; 2) the third speed active gear set driven gear DVN3 to the output shaft 94; or 3) be centered between the sixth and third speed active gear sets 98-6 and 98-3 in order to provide the second gear ratio (also referred to herein as configuring or shifting the transmission 26 into second gear). When the second speed active gear set driving gear DVG2 slides it does not disengage with the second speed active gear set driven gear DVN2 that is free to rotate on the input shaft 90 but not slide. Similarly, in various embodiments, the fourth speed active gear set driving gear DVG4 can be fixed in rotation to the output shaft 94 (e.g., via a splined engagement), but is allowed to: 1) slide into engagement with the fifth speed active gear set driven gear DVN5 to lock the fifth speed active gear set driven gear DVN5 to the output shaft 94; and 2) be centered between the third and fifth speed active gear sets 98-3 and 98-5 in order to provide the fourth gear ratio (also referred to herein as configuring or shifting the transmission 26 into fourth gear).

Accordingly, to engage the first speed active gear set 98-1 (e.g., to engage first gear) the dog ring 146 is slid into engagement with the first speed active gear set driven gear DVN1 to lock DVN1 to the output shaft 94. To engage the second speed active gear set 98-2 (e.g., to engage second gear) the third speed active gear set driving gear DVG3 is slid into engagement with the second speed active gear set driven gear DVN2 to lock DVN2 to the input shaft 90. To engage compound ratio gear set 106, the dog ring 150 is slid to the into engagement with the first speed active gear set driven gear DVN1 to lock DVN1 to the elongated shaft 138 of the passive gear set driving gear DVGPG (e.g., DVG6), and dog ring 154 is slid into engagement with passive gear set driven gear DVNPG (e.g., DVN6) to lock DVNPG to the elongated shaft 142 of the second speed active gear set driven gear DVN2. To engage the sixth speed active gear set 98-6 (e.g., to engage sixth gear) the gear dog ring 162 is slid into engagement with sixth speed active gear set driven gear DVN6 (e.g., DVNPG) to lock DVN6 to the input shaft 90 and the second speed active gear set driving gear DVG2 is slid into engagement with the sixth speed active gear set driving gear DVG6 (e.g., DVGPG) to lock DVG6 to the output shaft 94. To engage the third speed active gear set 98-3 (e.g., to engage third gear) the second speed active gear set driving gear DVG2 is slid into engagement with the third speed active gear set driven gear DVN3 to lock DVN3 to the output shaft 94. To engage the fourth speed active gear set 98-4 (e.g., engage fourth gear) the third speed active gear set driving gear DVG3 is slid into engagement with the fourth speed active gear set driven gear DVN4 to lock DVN4 to the input shaft 90. To engage the fifth speed active gear set 98-5, the fourth speed active gear set driving gear DVG4 is slid into engagement with the fifth speed active gear set driven gear DVN5 to lock DVN5 to the output shaft 94. To engage reverse gear set (RGS) the fifth speed active gear set driving gear DVG5 is slid into engagement with the reverse gear set driven gear DVNRGS to lock DVNRGS to the input shaft 90. The reverse gear set RGS comprises the driven gear DVNRGS that is free spinning on, and selectably engageable with, the input shaft 90, a driving gear DVGRGS that is fixedly mounted to the output shaft 94, and intermediate gear INTRGS that is disposed free spinning on a third shaft 170 between the reverse gear set driving gear DVGRGS and driven gear DVNRGS and operatively engages the reverse gear set driving gear DVGRGS with the driven gear DVN-RGS. The configuration shown in FIG. 8, by way of example, simplifies the transmission 26 and lowers costs by reusing slightly more complex parts and reducing part count, instead of having separate dog rings.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A transmission for a vehicle, said transmission comprising:
   an input shaft connectable to a power generation device such that the input shaft is rotatable by the power generation device at a power input rotational speed;
   an output shaft connectable to a driveline of the vehicle; and
   a plurality of gear sets mounted to the input shaft and the output shaft that are selectively operable to operably connect the input shaft to the output shaft such that at least a portion of the power input rotational speed is transferable to the output shaft to rotate the output shaft at a power output rotational speed, the gear sets comprising:
      a master active gear set having a driving gear mounted on one of the input shaft or the output shaft and a driven gear mounted on the other of the input shaft or output shaft, the master active gear set having a master gear ratio;
      a slave active gear set having a driving gear mounted on one of the input shaft or the output shaft and a driven gear mounted on the other of the input shaft or output shaft, the slave active gear set having a slave gear ratio; and a passive gear set having a passive gear ratio: the passive gear set comprising:
    a driving gear mounted on one of the input shaft or the output shaft, and one of connected to or connectable to the master active gear set driven gear; and
    a driven gear mounted on the other of the input shaft or output shaft, and connectable to the slave active gear set driven gear,
the passive gear set operable to selectively concurrently directly connect with the master active gear set driven gear and the slave active gear set driven gear to provide a compound ratio rotational speed reduction that is the product of the master active gear ratio, the slave active gear ratio and the passive gear ratio.

2. The transmission of claim 1, wherein the master active gear set is one of a plurality of active gear sets of the transmission that are each independently selectable and are structured and operable to independently provide a corresponding gear ratio between the input shaft and the output shaft, wherein the corresponding gear ratio of the master active gear set is the master gear ratio.

3. The transmission of claim 2, wherein the slave active gear set is another one of the plurality of active gear sets of the transmission that are each independently selectable and are structured and operable to independently provide a corresponding gear ratio between the input shaft and the output shaft, wherein the corresponding gear ratio of the slave active gear set is the slave gear ratio.

4. The transmission of claim 3, wherein the passive gear set is a gear set other than one of the plurality of active gear sets that are each independently selectable and are structured and operable to independently provide a corresponding gear ratio between the input shaft and the output shaft, wherein the passive gear set is dependently operable as part of a compound ratio low gear set of the transmission that is structured and operable to provide the compound ratio.

5. The transmission of claim 3, wherein the passive gear set is yet another one of the plurality of active gear sets of the transmission that are each independently selectable and are structured and operable to independently provide a corresponding gear ratio between the input shaft and the output shaft, wherein the corresponding gear ratio of the passive active gear set is the passive gear ratio, and wherein the passive gear set is co-functional as part of a compound ratio low gear set of the transmission that is structured and operable to provide the compound ratio.

6. A transmission for a vehicle, said transmission comprising:
    an input shaft connectable to a power generation device such that the input shaft is rotatable by the power generation device at a power input rotational speed;
    an output shaft connectable to a driveline of the vehicle; and
    a compound ratio low gear set that is selectively operable to operably connect the input shaft with the output shaft such that at least portion of the power input rotational speed is transferable to the output shaft to rotate the output shaft at a power output rotational speed, wherein the compound ratio low gear set provides a compound ratio rotational speed reduction between the power input rotational speed to the power output rotational speed, wherein the compound ratio low gear set comprises:
        a master active gear set comprising a driving gear mounted on one of the input shaft or the output shaft and a driven gear mounted on the other of the input shaft or output shaft, and operable to selectively operably connect the input shaft with the output shaft to selectively provide a master gear ratio between the input shaft and the output shaft;
        a slave active gear set comprising a driving gear mounted on one of the input shaft or the output shaft and a driven gear mounted on the other of the input shaft or output shaft, and operable to selectively operably connect the input shaft with the output shaft to selectively provide a slave gear ratio between the input shaft and the output shaft; and
        a passive gear set having a passive gear ratio, wherein a first gear of the passive gear set is one of connected to or selectively connectable with one gear of the master active gear set, and a second gear of the passive gear set is one of connected to or selectively connectable with one gear of the slave active gear set to provide the compound ratio rotational speed reduction, wherein the compound ratio is substantially equal to the product of the master gear ratio, the slave gear ratio and the passive gear ratio.

7. The transmission of claim 6, wherein the master active gear set is one of a plurality of active gear sets of the transmission that are each independently selectable and are structured and operable to independently provide a corresponding gear ratio the input shaft and the output shaft, the corresponding gear ratio of the master active gear set being the master gear ratio.

8. The transmission of claim 7, wherein the slave active gear set is another one of the plurality of active gear sets of the transmission that are each independently selectable and are structured and operable to independently provide a corresponding gear ratio between the input shaft and the output shaft, the corresponding gear ratio of the slave active gear set being the slave gear ratio.

9. The transmission of claim 8, wherein the passive gear set is a gear set other than one of the plurality of active gear sets that are each independently selectable and are structured and operable to independently provide a corresponding gear ratio between the input shaft and the output shaft, and is dependently operable as part of the compound ratio low gear set.

10. The transmission of claim 8, wherein the passive gear set is yet another one of the plurality of active gear sets of the transmission that are each independently selectable and are structured and operable to independently provide a corresponding gear ratio between the input shaft and the output shaft, the corresponding gear ratio of the passive active gear set being the passive gear ratio.

11. A method for outputting a rotational speed reduction ratio between an input shaft and an output shaft of a transmission, said method comprising:
    selectively operably connecting a driving gear of a master active gear set of a transmission to one of an input shaft and an output shaft of the transmission, the master active gear set having a master gear ratio;
    selectively operably connecting a driving gear of a slave active gear set of the transmission to the other of the one of the input shaft and the output shaft of the transmission, the slave active gear set having a slave gear ratio; and
    selectively connecting a compound ratio gear set of the transmission to provide a compound ratio rotational speed reduction between the input shaft and the output shaft of the transmission, wherein selectively connecting the compound ratio gear set comprises:

selectively connecting a driving gear of a passive gear set of the transmission to a driven gear of the master active gear set and a driven gear of the passive gear set to a driven gear of the slave active gear set such that the master active gear set is operably connected to the slave active gear set via the passive gear set, thereby defining the compound ratio gear set comprising the master active gear set, the slave active gear set and the passive gear set, wherein the compound ratio gear set is structured and operable to provide the compound ratio rotational speed reduction between the input shaft and the output shaft of the transmission that is substantially equal to the product of the master active gear ratio, the slave gear ratio and the passive gear ratio.

12. The method of claim 11, wherein the master active gear set is one of a plurality of active gear sets of the transmission that are each independently selectable and are structured and operable to independently provide a corresponding gear ratio between the input shaft and the output shaft, the corresponding gear ratio of the master active gear set being the master gear ratio, wherein the method further comprises:
   selectively disconnecting the compound ratio gear set; and
   selectively connecting the master active gear set with one of the input shaft and the output shaft to provide the master gear ratio between the input shaft and the output shaft.

13. The method of claim 12, wherein the slave active gear set is another one of the plurality of active gear sets of the transmission that are each independently selectable and are structured and operable to independently provide a corresponding gear ratio between the input shaft and the shaft, the corresponding gear ratio of the slave active gear set being the slave gear ratio, wherein the method further comprises:
   selectively disconnecting the compound ratio gear set; and
   selectively connecting the slave active gear set with one of the input shaft and the output shaft to provide the slave gear ratio between the input shaft and the output shaft.

14. The method of claim 13, wherein the passive gear set is yet another one of the plurality of active gear sets of the transmission that are each independently selectable and are structured and operable to independently provide a corresponding gear ratio between the input shaft and the shaft, the corresponding gear ratio of the passive active gear set being the passive gear ratio, wherein the method further comprises:
   selectively disconnecting the compound ratio gear set; and
   selectively connecting the passive gear set with one of the input shaft and the output shaft to provide the passive gear ratio between the input shaft and the output shaft.

* * * * *